United States Patent
Arslan et al.

(10) Patent No.: US 10,610,968 B2
(45) Date of Patent: *Apr. 7, 2020

(54) COATED PANE WITH PARTIALLY DE-COATED REGIONS

(71) Applicant: SAINT-GOBAIN GLASS FRANCE, Courbevoie (FR)

(72) Inventors: Ilkay Arslan, Aachen (DE); Michael Behmke, Düsseldorf (DE); Stefan Droste, Herzogenrath (DE); Ingo Von Der Weiden, Aachen (DE); Dirk Wohlfeil, Raeren (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 40 days.

This patent is subject to a terminal disclaimer.

(21) Appl. No.: 15/842,242

(22) Filed: Dec. 14, 2017

(65) Prior Publication Data

US 2018/0111228 A1    Apr. 26, 2018

Related U.S. Application Data

(63) Continuation of application No. 14/773,009, filed as application No. PCT/EP2014/050996 on Jan. 20, 2014, now Pat. No. 9,873,169.

(30) Foreign Application Priority Data

Mar. 7, 2013    (EP) ..................................... 13158152

(51) Int. Cl.
*B32B 3/00*      (2006.01)
*B23K 26/362*   (2014.01)
(Continued)

(52) U.S. Cl.
CPC ........ *B23K 26/362* (2013.01); *B23K 26/0006* (2013.01); *B23K 26/355* (2018.08);
(Continued)

(58) Field of Classification Search
None
See application file for complete search history.

(56) References Cited

U.S. PATENT DOCUMENTS 6,356,236 B1 *  3/2002  Maeuser ................. B32B 17/10
                                                            343/713
6,730,389 B2    5/2004  Voeltzel
(Continued)

FOREIGN PATENT DOCUMENTS

| CN | 102206046 A | 10/2011 |
| CN | 102640562 A | 8/2012 |

(Continued)

OTHER PUBLICATIONS

International Search Report as issued in International Patent Application No. PCT/EP2014/050996, dated Feb. 26, 2014.

*Primary Examiner* — Seth Dumbris
(74) *Attorney, Agent, or Firm* — Pillsbury Winthrop Shaw Pittman LLP

(57) ABSTRACT

A coated pane with a communication window includes a base pane, a metal-containing coating on the base pane, a grid area made of intersecting, de-coated inner gridlines in the metal-containing coating, wherein the grid area has a grid area edge, and the grid area edge has intersecting outer gridlines, wherein the outer gridlines have interruptions increasing in size from the outer edge of the grid area all the way to the end of the grid surface edge.

18 Claims, 5 Drawing Sheets

Figure 1:
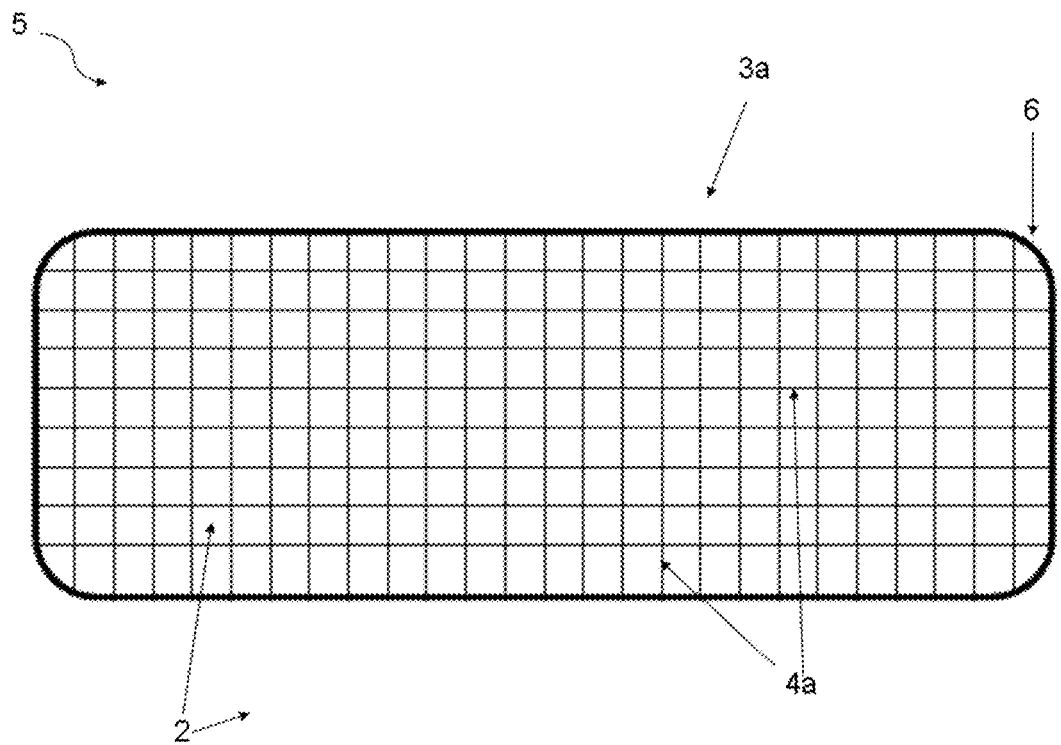

(51) Int. Cl.
  *B23K 26/352* (2014.01)
  *B23K 26/00* (2014.01)
  *B23K 26/40* (2014.01)
  *B23K 26/364* (2014.01)
  *B23K 26/361* (2014.01)
  *C03C 17/36* (2006.01)
  *H01Q 1/12* (2006.01)
  *B23K 103/10* (2006.01)
  *B23K 103/00* (2006.01)
  *B60J 1/02* (2006.01)

(52) U.S. Cl.
  CPC .......... *B23K 26/361* (2015.10); *B23K 26/364* (2015.10); *B23K 26/40* (2013.01); *C03C 17/36* (2013.01); *H01Q 1/1271* (2013.01); *B23K 2103/10* (2018.08); *B23K 2103/50* (2018.08); *B60J 1/02* (2013.01); *C03C 2218/328* (2013.01)

(56) References Cited

U.S. PATENT DOCUMENTS

| | | |
|---|---|---|
| 2002/0192473 A1 | 12/2002 | Gentilhomme et al. |
| 2004/0107641 A1 | 6/2004 | Walton et al. |
| 2004/0113860 A1 | 6/2004 | Walton |
| 2004/0200821 A1 | 10/2004 | Voeltzel |
| 2005/0035913 A1 | 2/2005 | Baranski |
| 2007/0082219 A1 | 4/2007 | Fleury et al. |
| 2007/0090092 A1* | 4/2007 | Forstner ................ B08B 7/0035 216/67 |
| 2011/0146172 A1 | 6/2011 | Mauvernay et al. |
| 2014/0107641 A1 | 4/2014 | Johnston |

FOREIGN PATENT DOCUMENTS

| | | |
|---|---|---|
| DE | 198 17 712 C1 | 2/2000 |
| DE | 103 14 094 A1 | 3/2004 |
| EP | 0 678 483 B1 | 12/1998 |
| JP | S60-195251 U | 12/1975 |
| JP | S60-019525 U | 2/1985 |
| JP | S61-127062 U | 8/1986 |
| JP | H03-25355 A | 2/1991 |
| JP | 2008-056225 A | 3/2008 |
| JP | 2011-102217 A | 5/2011 |
| JP | 2011-102218 A | 5/2011 |
| KR | 10-2001-0013734 | 2/2001 |
| WO | WO 99/45961 A1 | 10/1999 |
| WO | WO 2004/051869 A2 | 6/2004 |
| WO | WO 2012/031907 A1 | 3/2012 |
| WO | WO 2012/031908 A1 | 3/2012 |
| WO | WO 2012/066324 A1 | 5/2012 |
| WO | WO 2014/112648 A1 | 1/2017 |

* cited by examiner

A base pane (1) is provided with a metal-containing coating (2).

The metal-containing coating (2) is de-coated locally with a laser in gridlines (4a) and a grid area (3a) and a grid area edge (3b) are obtained.

The outer gridlines (4b) have interruptions (4c) increasing in size from the grid area (3a) to the end of the grid area edge (3b).

The base pane (1) is subsequently bent.

COATED PANE WITH PARTIALLY DE-COATED REGIONS

CROSS-REFERENCE TO RELATED APPLICATIONS

This application is a continuation of U.S. patent application Ser. No. 14/773,009, filed on Sep. 4, 2015, which is the U.S. National Stage of PCT/EP2014/050996, filed Jan. 20, 2014, which in turn claims priority to European patent application number 13158152.2 filed Mar. 7, 2013. The content of these applications are incorporated herein by reference in their entireties.

The invention relates to a coated pane with windows in the form of partially de-coated regions for permeability of radiofrequency radiation as well as a method for its production and its use.

Panes with metal layers are widespread both in the field of architectural glazings and in the field of motor vehicle glazings. Depending on the metal coating, these metal-based coatings influence the transmittance, reflectance, and absorption behavior of electromagnetic radiation. In particular, the reduction of thermal radiation or the electrical heating of the glass surface are core functions of many glass coatings based on electrically conductive metals.

Coatings made of silver significantly reduce the transmittance of infrared thermal radiation in the space of a motor vehicle or a building situated behind the pane. In particular, in the case of motor vehicles, this property can also be combined via an electrical connection with a heating function of the silver-containing coating. The specific sheet resistance of silver enables the heating of a pane with very thin silver-containing layers. Consequently, due to the advantages mentioned, panes with silver-containing or metal coatings are found in increasingly more motor vehicles.

However, panes with silver-containing coatings also entail disadvantages; for example, radiofrequency radiation is reflected by many metal-containing coatings. The operation of many sensors, navigation, telecommunication, or radio devices is significantly impaired thereby. To solve these problems, an at least partial-area de-coating of the metal-containing coating is necessary. In the example of electromagnetic radiation in the radiofrequency range, such as FM, AM, UHF, VHF, radar, or microwave radiation, a mesh-like or grid-like de-coating is necessary for this. The grid meshes must have a distance between the lines that is significantly smaller than the wavelength of the desired electromagnetic radiation in question. To that end, the metal-containing coatings are, for example, removed in the form of lines using a suitable laser. Since only small amounts of the metal-containing coating have to be removed, the infrared radiation reflecting effect is largely retained.

EP 0 678 483 B1 discloses a glass substrate with a plurality of thin layers. These layers include an adhesive layer based on titanium oxide, tin oxide, or tantalum oxide, a cover layer, and a functional layer from the group of stainless steels. The thickness of the functional layer is preferably 15 nm to 45 nm.

US 2002/192473 A1 discloses a transparent substrate with a multilayer coating that can act on solar radiation. The coating includes at least one functional metal layer made of niobium, tantalum, or zirconium and a cover layer made of aluminum nitride, aluminum oxynitride, or silicon nitride.

US 2011/0146172 A1 discloses a transparent substrate with a thin multilayer coating. The multilayer coating includes at least two absorbing functional layers and two transparent layers made of a dielectric material. The functional layers preferably contain a metal from the group made up of niobium, tantalum, and zirconium. In a preferred embodiment, the functional layers are at least partially nitrided.

US 2007/0082219 A1 discloses a heatable glass substrate with a multilayer silver-containing coating. The coating enables both temperature control in the motor vehicle and a heating function of the pane. The coating and, with it, the pane are impermeable to electromagnetic radiation.

DE 198 17 712 C1 discloses a glass pane with a coating and a radiation window. The window is implemented in a limited contiguous area of the panel, in which there is a ratio of coating-free area to the total area of at least 25% with areal distribution of coating-free and coated areas.

WO2004/051869 A2 discloses a metal coated pane that has a window permeable to radiofrequency signals. The window includes various radiofrequency-signal-permeable structures, for example, vertical or horizontal beams or zigzag structures.

U.S. Pat. No. 6,730,389 B2 discloses a metal coated pane that has multiple windows permeable to radiofrequency radiation connected to each other.

WO 2012/066324 A1 discloses a method for producing a coated glazing with a window permeable to electromagnetic radiation in the radiofrequency range. The window is produced by two-dimensional curved patterning using a laser.

When a coated pane is at least partially de-coated in the region of the communication window, stress develops in the glass in the transition zone between the coated pane and the partially de-coated pane during the bending process. The stresses probably result from the different heat absorption of the coated and partially de-coated regions on the glass surface. Consequences of the buildup of stress in the border region between the coated pane surface and the communication window are, in many cases, optical distortions on the glass surface, which negatively affect the overall impression of the pane. Due to legal regulations, for example, ECE R43, many motor vehicle manufacturers also demand compliance with stricter threshold values in the area of the optical quality of motor vehicle window panes.

The object of the present invention consists in providing a metal coated pane, which has, in the border region between a partially de-coated communication window and the areal coating of the pane, no, or at least reduced, optical distortions.

The object of the present invention is accomplished in accordance with the independent claim 1. Preferred embodiments emerge from the subclaims.

A method according to the invention for producing a coated pane with a communication window and its use emerge from other independent claims.

The coated pane according to the invention with a communication window comprises at least a base pane with a metal-containing coating. The pane preferably contains flat glass, float glass, quartz glass, borosilicate glass, soda lime glass, and/or mixtures thereof. Alternatively, the pane can also include polymers such as polycarbonate or polymethyl methacrylate (Plexiglas). The coating preferably contains tin-doped indium oxide (ITO), aluminum-doped zinc oxide (AZO), fluorine-doped tin oxide (FTO, $SnO_2$:F), antimony-doped tin oxide (ATO, $SnO_2$:Sb), aluminum, zinc, indium, gallium, silver, gold, tin, tungsten, copper, cadmium, niobium, strontium, silicon, zinc, selenium, and/or mixtures or alloys thereof, particularly preferably silver. In addition to the actual coating, further dielectric layers are preferably also present. The dielectric layer preferably includes $SiO_2$, $SnO_2$, $Bi_2O_3$, ZnO, $TiO_2$, $Ta_2O_5$, AlN, $Si_3N_4$, and/or mixtures thereof. The order of the deposition of a dielectric layer and a functional layer on the composite pane is variable; preferably, a plurality of functional layers and dielectric layers are deposited on the composite pane. Optionally, further layers, for example, cover layers, can be present. The metal-containing coating is preferably impermeable to radar waves, microwaves, and/or radio waves.

The base pane has, on the metal-containing coating, a locally delimited grid area made of intersecting and de-coated inner gridlines. This means that the gridlines are introduced into the metal-containing coating, preferably by de-coating, in particular laser de-coating. The gridlines are, consequently, regions without metal-containing coating. The grid area can have any rectangular and/or rounded shape. The grid area is areally surrounded completely or partially by a grid area edge. The grid area edge has, like the grid area, intersecting outer gridlines. The outer gridlines preferably form an extension of the inner gridlines outward in the direction of the un-patterned metal coating. The basic pattern of the inner gridlines and outer gridlines is similarly or identically implemented. The outer gridlines have interruptions increasing in size from the outer edge of the grid area all the way to the end of the grid surface edge. In the context of the invention, the expression "interruption" means a lack of patterning in the region of the outer gridlines or also preferably in the region of the points of intersection of the outer gridlines.

The outer gridlines preferably include extensions of the inner gridlines. The outer gridlines particularly preferably also include gridlines that are arranged parallel to the outermost, interruption-free grid line bordering the grid area. The intersecting outer gridlines of the grid area edge implemented according to the invention are, in this preferred embodiment, thus formed at least by:

extensions of the inner gridlines, for one thing, and
gridlines, which are arranged parallel to the outermost gridline bordering the grid area, for another. The grid area edge can moreover include additional outer gridlines.

The particular advantage resides in a particular optical inconspicuousness and a particular aesthetic perception of the pane, largely nondisruptive for the observer.

In the context of the invention, the "grid area" is defined by the region that has no interruptions.

The interruptions according to the invention can be arranged in the extensions of the inner gridlines and/or in the outer gridlines arranged parallel to the outermost bordering grid line. In a particularly preferred embodiment, the interruptions are arranged at the points of intersection of the outer gridlines.

The gridlines preferably have a width from 30 µm to 200 µm, particularly preferably 70 µm to 120 µm. The width is governed by the relevant electromagnetic radiation and the optical resolution of the laser scanner necessary for their production.

The grid lines preferably form squares and/or rectangles. In the case of bent panes, in particular with three-dimensionally bent panes, the rectangular shapes can deviate from the right angle, and can transition, for example, into a quadrangle, trapezoid, or parallelogram. Depending on the, in particular spatial, geometry of the pane, even rounded or partially rounded sensor windows or communication windows are possible.

The gridlines are preferably from 0.2 mm to 15 mm, preferably 0.7 mm to 3 mm apart. The preferred distance between the gridlines enables sufficient transparency for radiofrequency electromagnetic waves.

The area of the interruptions preferably increases gradually to 70% to 100% of the area of the inner gridlines between the points of intersection. In the context of the invention, the width of the grid area edge is preferably from 1 mm to 30 mm. The gradual increase preferably occurs over a distance of 1 mm to 30 mm from the non-interrupted gridlines (100%) to 70% to 90% of the original area of the gridlines between two adjacent points of intersection.

The metal-containing coating is preferably impermeable to radar waves, microwaves, and/or radio waves.

The base pane preferably contains float glass. The inner gridlines and the outer gridlines are preferably at an angle of 30° to 60°, particularly preferably of 40° to 50°, relative to the float glass production direction of the base pane. The term "float glass production direction" describes the direction of movement of the glass during the float glass production process. Surprisingly, the optical defects after the bending of the partially de-coated pane are lower when the gridlines are at an above-mentioned angle relative to the direction of movement of the glass in the tin bath (float glass process) and subsequently in the belt conveyor.

The invention further comprises a windshield with the characteristics of the coated pane of the invention with a communication window.

The invention further comprises a method for producing a coated pane with a communication window. In a first process step, a base pane is provided with a metal-containing coating. Optionally, additional dielectric and additional metal layers can also be applied. In the next step, the metal-containing coating is locally de-coated in the form of gridlines with a laser, and a first grid area as well as a grid area edge is obtained. The outer gridlines have interruptions increasing in size from the inner grid area all the way to the end of the grid surface edge. The interruptions can be located both in the region of the points of intersection and on the gridlines between the points of intersection. In the context of the invention, the term "interruption" means a lack of patterning in the region of the outer gridlines. In a final step, the coated and (partially) patterned base pane is bent in the range of the softening temperature of the respective glass. The outer interrupted gridlines according to the invention surprisingly reduce the optically visible distortions between the coated and partially de-coated regions in the vicinity of the communication window. In particular, the different heat absorption of coated regions of the base pane and the de-coated gridlines quickly results, in the case of communication windows according to the prior art, in optical disruptions, for example, inhomogeneous reflections of light.

The laser is preferably guided along the metal-containing coating on the base pane at a speed from 0.100 m/s to 10 m/s. The laser preferably has an output from 1 W to 10 kW and/or preferably includes a carbon dioxide, YAG, Nd-YAG, ytterbium-YAG laser, holmium YAG laser, erbium YAG laser,—neodymium glass laser,—excimer laser,—fiber laser,—disk laser,—slab laser, or diode laser.

The laser is preferably guided by a plotter. The plotter can further increase the size of the grid areas.

The invention further comprises the use of the coated pane according to the invention with a communication window as architectural, motor vehicle, ship, airplane, helicopter, or train glazing. The coated pane according to the invention with a communication window is preferably used as a motor vehicle windshield.

In the following, the invention is explained in detail with reference to drawings. The drawings are purely schematic representations and are not true to scale. They in no way restrict the invention. The positions of the black lines mark the de-coated regions. On an actual coated pane, these de-coated regions appear slightly brighter than the coated surroundings.

Figure 2:
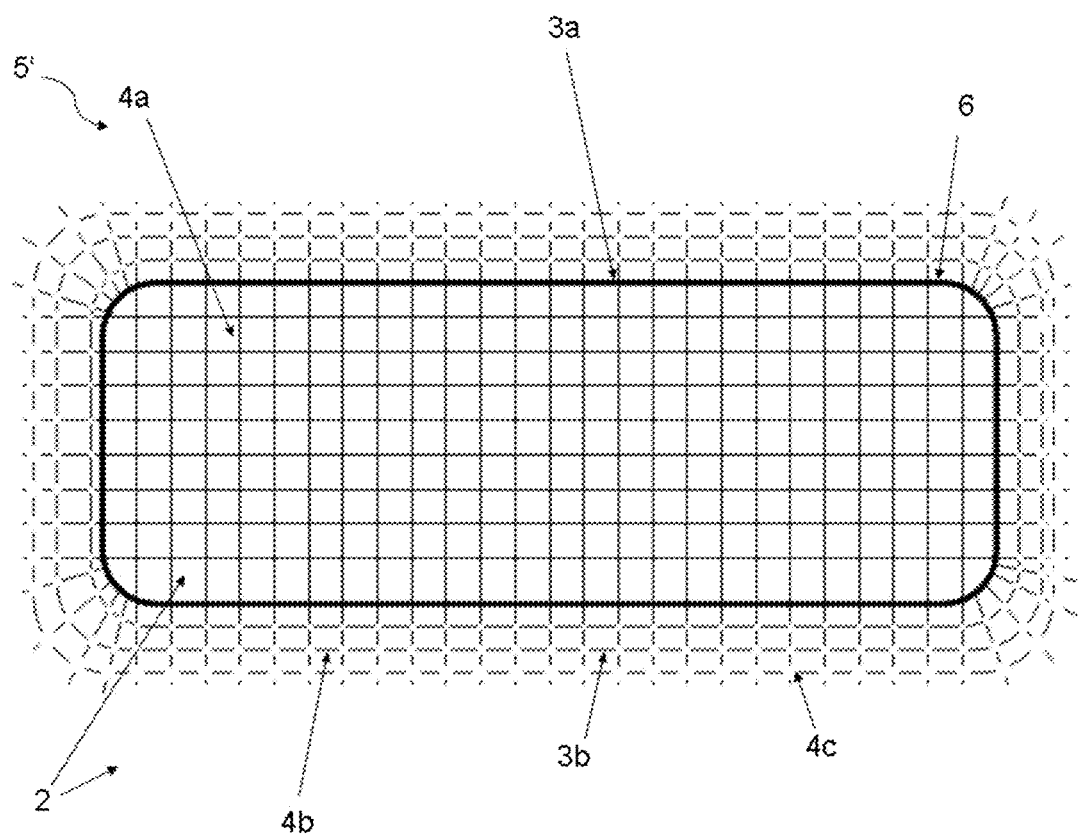
Figure 3:
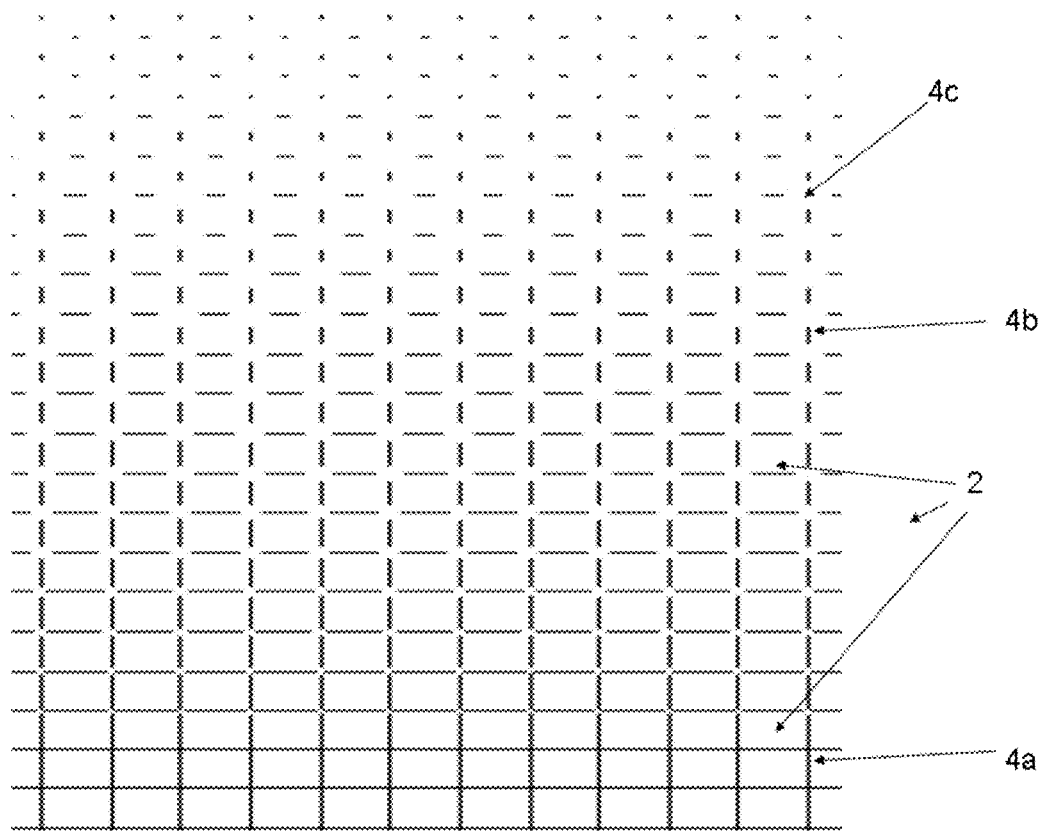
Figure 4:
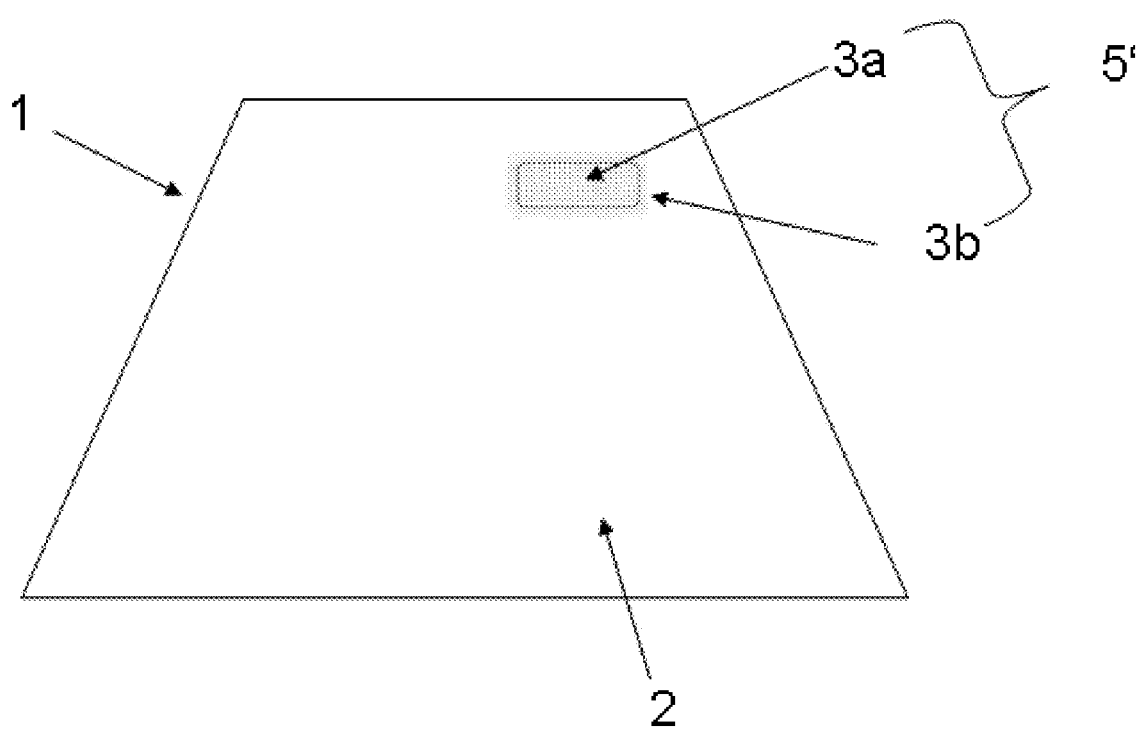
Figure 5:
Figure 5:
Figure 5:

They depict:

FIG. 1 a schematic view of a communication window according to the prior art,

FIG. 2 a schematic view of a communication window according to the invention,

FIG. 3 an enlarged view of the inner gridlines and outer gridlines,

FIG. 4 a view of a coated pane according to the invention with a communication window, and FIG. 5 a flowchart for producing a pane according to the invention with a communication window.

FIG. 1 depicts a schematic view of a communication window (5) according to the prior art. A de-coated grid area (3a) is applied on the metal-containing coating (2) in the region of the inner gridlines (4a). In the border region (6) between the grid area (3a) and the surrounding metal-containing coating (2), optical distortions can easily occur on the actual pane, for example, light reflections or blurring. The border region (6) is optically highlighted for the purposes of illustration; however, as a rule is not characterized in the actual pane by a bold line (de-coating). In particular, these optical effects develop in the case of base panes (1) that are bent after the coating process and subsequent partial de-coating. The different temperature absorption capacity of the coated and partially de-coated regions during the bending process creates a different stress profile in the base pane (1) (not shown).

FIG. 2 depicts a schematic view of a communication window (5') according to the invention. A de-coated grid area (3a) is applied on the metal-containing coating (2) in the region of the inner gridlines (4a). The grid area (3a) is surrounded by a grid area edge (3b), wherein the grid area edge (3b) is formed by outer gridlines (4b). The outer gridlines (4b) have interruptions (4c) increasing in size from the inside to the outside. These interruptions (4c) can be arranged either as depicted in FIG. 2 in the region of the points of intersection between the outer gridlines (4b) or on the outer gridlines (4b) themselves between the points of intersection. Surprisingly, the bordering of the grid area (3a) with the grid area edge (3b) according to the invention significantly reduces the occurrence of optical disruptions in the region of the communication window (5').

In the context of the invention, the grid area 3a is the region that has no interruptions 4c of the gridlines. The outermost grid line (border region 6) bordering the grid area 3a is depicted wider than the other gridlines in the figure merely by way of illustration. The grid area edge 3b contains outer gridlines 4b, which form extensions of the inner gridlines 4a. The grid area edge 3b also contains outer gridlines 4b, which are arranged parallel to the outermost gridline 6 depicted wider bordering the grid area 3a. The grid area edge 3b also contains additional outer gridlines 4b in the region of the rounded corners of the grid area 3a.

FIG. 3 depicts an enlarged view of the inner gridlines (4a) and outer gridlines (4b). The inner gridlines (4a) and the outer gridlines (4b) preferably run into each other without transition. The interruptions (4c), for example, at the intersections of the gridlines (4b), indicate the beginning of the outer gridlines (4b). The area of the interruptions (4c) increases from the inner gridlines (4a) in the direction of the outer gridlines (4b). This increase in the interruptions (4c) produces a gradual transition between the partially de-coated communication window (5') according to the invention and the metal-containing coating (2) on the base pane (1).

FIG. 4 depicts a view of a coated pane according to the invention with a communication window (5') according to the invention. A metal-containing coating (2) is applied on a base pane (1). A communication window (5') according to the invention comprising a grid area (3a) and a grid area edge (3b) is situated on a region of the metal-containing coating (2). Additional communication windows (5') can be applied on the metal-containing coating (2).

FIG. 5 depicts a flowchart for producing a pane according to the invention with a communication window (5'). In a first process step, a base pane (1) is provided with a metal-containing coating (2). In the following steps, the metal-containing coating (2) is de-coated locally in the form of gridlines with a laser, and a first grid area (3a) and a grid area edge (3b) are obtained. The outer gridlines (4b) have interruptions (4c) increasing in size from the inner grid area (3a) all the way to the end of the grid surface edge (3b). Surprisingly, the gridlines (4a, 4b) according to the invention reduce the optically visible distortions between the coated and partially de-coated regions in the vicinity of the communication window (5). In particular, the different heat absorption of coated regions of the base pane (1) and the de-coated gridlines (4a) quickly results in optical disruptions, for example, inhomogeneous light reflections.

LIST OF REFERENCE CHARACTERS (1) base pane
(2) metal-containing coating
(3a) grid area
(3b) grid area edge
(4a) inner gridlines
(4b) outer gridlines
(4c) interruptions
(5) communication window according to the prior art
(5') communication window according to the invention
(6) border region of the grid area

The invention claimed is:

1. A coated pane comprising:
   a base pane;
   a metal-containing coating on the base pane;
   a grid area made of intersecting, de-coated inner gridlines in the metal-containing coating, the inner gridlines having no interruptions, and
   an outer grid area positioned at a periphery of the grid area, the outer grid area made of intersecting, de-coated outer gridlines in the metal-containing coating, the outer gridlines having a plurality of interruptions,
   wherein the interruptions are located at the intersections of lines forming the outer gridlines, and wherein each of the intersections includes one of the interruptions.

2. The coated pane according to claim 1, wherein the outer grid area surrounds the grid area.

3. The coated pane according to claim 1, wherein a size of each interruption in the outer grid area is based on a location of the interruption from the periphery of the grid area.

4. The coated pane according to claim 3, wherein the size of each interruption increases with an increasing distance from the periphery of the grid area.

5. The coated pane according to claim 1, wherein the inner gridlines are formed of intersecting lines, said intersecting lines extending beyond the periphery of the grid area to form the outer gridlines in the outer grid area so that the intersecting lines have no interruptions in the grid area and have the interruptions in the outer grid area.

6. The coated pane according to claim 5, wherein the intersecting lines include a first plurality of parallel lines and a second plurality of parallel lines.

7. The coated pane according to claim 6, wherein the first plurality of parallel lines are perpendicular to the second plurality of parallel lines.

8. The coated pane according to claim 6, wherein at least one of the first plurality of parallel lines and/or at least one of the second plurality of parallel lines includes more than one of the interruptions in the outer grid area.

9. The coated pane according to claim 1, wherein the inner and/or outer gridlines have a width from 30 μm to 200 μm.

10. The coated pane according to claim 1, wherein the inner and/or outer gridlines form squares, rhombuses, parallelograms, and/or rectangles.

11. The coated pane according to claim 1, wherein the inner and/or outer gridlines are from 0.1 mm to 15 mm apart.

12. The coated pane according to claim 1, wherein the outer grid area has a width from 1 mm to 30 mm.

13. The coated pane according to claim 1, wherein the base pane comprises float glass.

14. The coated pane according to claim 1, wherein the base pane comprises float glass and the inner gridlines and the outer gridlines have an angle of 30° to 60° relative to a float glass production direction of the base pane.

15. A windshield comprising a coated pane according to claim 1.

16. A method for producing a coated pane that includes a base pane;
a metal-containing coating on the base pane;
a grid area made of intersecting, de-coated inner gridlines in the metal-containing coating, the inner gridlines having no interruptions, and
an outer grid area positioned at a periphery of the grid area, the outer grid area made of intersecting, de-coated outer gridlines in the metal-containing coating, the outer gridlines having a plurality of interruptions,
wherein the interruptions are located at the intersections of lines forming the outer gridlines, and wherein each of the intersections includes one of the interruptions,
the method comprising:
de-coating the metal-containing coating provided on the base pane locally with a laser in gridlines to obtain the grid area made of intersecting, de-coated inner gridlines in the metal-containing coating, the inner gridlines having no interruptions;
de-coating the metal-containing coating locally with the laser in the outer grid area positioned at a periphery of the grid area, the outer grid area made of intersecting, de-coated outer gridlines in the metal-containing coating, the outer gridlines having the plurality of interruptions, and
bending the base pane.

17. The method according to claim 16, wherein the laser is guided at a speed from 0.100 m/sec to 10 m/sec along the metal-containing coating.

18. The method according to claim 16, wherein the laser comprises a carbon dioxide, YAG, Nd-YAG, or diode laser.

* * * * *